United States Patent
Jones, Jr.

(10) Patent No.: US 6,357,194 B1
(45) Date of Patent: Mar. 19, 2002

(54) TAPERED DOVETAIL JOINT

(76) Inventor: Archie Valejo Jones, Jr., 5416 Lower Creek Ct., Apex, NC (US) 27502

( * ) Notice: Subject to any disclaimer, the term of this patent is extended or adjusted under 35 U.S.C. 154(b) by 0 days.

(21) Appl. No.: 09/267,946

(22) Filed: Mar. 11, 1999

(51) Int. Cl.[7] .................................................. E04B 2/08
(52) U.S. Cl. .................... 52/590.1; 52/586.2; 52/590.2; 52/591.5; 52/591.2; 52/592.1; 403/358; 403/381; 248/223.41; 248/224.51
(58) Field of Search ................................. 52/271, 586.1, 52/586.2, 590.1, 590.2, 591.5, 591.1, 591.2, 592.1; 403/355, 356, 358, 381; 248/222.13, 223.41, 224.51

(56) References Cited

U.S. PATENT DOCUMENTS

| | | | | |
|---|---|---|---|---|
| 435,759 A | * | 9/1890 | Marter | |
| 2,882,714 A | * | 4/1959 | Gagle et al. | |
| 4,003,172 A | * | 1/1977 | Pawl | 52/279 |
| 4,019,298 A | * | 4/1977 | Johnson, IV | 52/594 |
| 4,287,693 A | * | 9/1981 | Collette | 52/177 |
| 4,867,598 A | * | 9/1989 | Winter, IV | 403/381 |
| 5,664,793 A | * | 9/1997 | Engibarov | 279/124 |
| 5,746,038 A | * | 5/1998 | Houk | 52/590.1 |
| 5,775,046 A | * | 7/1998 | Fanger et al. | 52/590.1 |

\* cited by examiner

*Primary Examiner*—Carl D. Friedman
*Assistant Examiner*—Yvonne M. Horton

(57) ABSTRACT

The tapered dovetail joint is a method of joining two boards, or other rigid materials such as particleboard, wafer board, etc., by a unique type of modified dovetail joint. The modification to the classic dovetail joint includes tapering the dovetail pins as well as the dovetail tails with the same angle of taper in the same direction. The mating of this tapered dovetail joint will be greatly facilitated due to these corresponding tapers. The tapered nature of this joint minimizes difficulties in assembly due to the wedging action that takes place as the two boards are brought into union to create the joint. This wedging action allows the joint to be assembled even when there is moderate damage to the tails or pins including swelling—due to moisture, from the time of manufacture to time of assembly, impact damage, as well as minor manufacturing tolerance deficiencies in cutting of the pins and tails.

15 Claims, 3 Drawing Sheets

TAPERED DOVETAIL JOINT

BACKGROUND OF THE INVENTION

There are many methods of joining two pieces of material. The prior art upon which significant improvements will be described is that of the classic dovetail joint.

In the description that follows, the classic dovetail joint will be referred to as a base for explanation. The dovetail joint is a joint most commonly used for drawer construction in high-quality furniture. A dovetail joint is a modified finger joint where a reversed, wedge-shaped finger or pin fits into a matched socket formed by a pair of tails. (The socket, formed by a pair of tails, will be referred to simply as "the tail" or "tails".) The shape of the pins and of the tails into which they are inserted resemble the spread of a dove's tail, hence the name—a dovetail joint.

The dovetail form creates a joint that is secured in one direction without dependence on glue or other fastening methods. When the joint is fastened or glued, movement is controlled in all directions, making this type of joint extremely strong.

A series of dovetails may be used to lock two boards together, such as in a drawer, creating a corner that is highly desirable due to its strength and durability.

In addition to great strength and durability, many find the dovetail joint to be visually pleasing and indicative of quality woodwork.

With the many benefits offered by a dovetail joint, one must ask the question: why is this joint not used to a greater extent in construction techniques? The answer is fairly simple—dovetail joints can be difficult to assemble. Due to the tight tolerance requirements, errors in fabrication—not keeping within the required tolerances, damage to the pins or tails prior to assembly, or a slight swelling of the pins or tails (due to moisture) prior to assembly can make it difficult to assemble the dovetail joint.

As an amateur woodworker there is a type of project I have enjoyed over the years. I have made numerous enclosures to be used outdoors as sandboxes, raised gardens, flowerbeds, planters around a mailbox post, and the like. On many of these projects, the joints have failed over time, pulling apart. In analyzing the failure of these jointing methods I have recognized some of the problems associated with this type of application. I believe that a dovetail joint could solve many of the jointing shortcomings.

Modern technology has greatly facilitated the cutting of dovetail joints with the use of jigs, templates, special dovetail router bits, power tools, etc. The greatest problem with the dovetail joint is the difficulty of assembling the joint if there is any swelling of materials, damage to pins or the tails that make up the joint, or fabrication that is out of tolerance in cutting the dovetails.

A new solution to the dovetail joint challenge, and the basis for this NEW INVENTION is slightly tapering the pins and their corresponding tails, in the same direction; a new jointing method I am calling a tapered dovetail joint. This new joint incorporates the benefits of the classic dovetail joint—strength, durability and aesthetically pleasing to some, while significantly increasing the ease of assembly. The tapered design allows for a loose fit of the joint as the two pieces are brought together. Once joined, the tapered dovetail creates a tight joint with characteristics similar, or superior to the classic dovetail joint. The tapers compensate for minor tolerance deviations in fabrication, defects or damage to the pins or tails that may have occurred, by allowing a loose fit initially. As the two pieces are brought together the clearance between the contact sides of the pin and the contact sides of the tail decrease gradually (the joint begins to tighten) until the units are brought into full contact and the union is made. The tapered dovetail joint offers many advantages over traditional dovetail joints. A few of these advantages are explained for a better understanding of the technology:

Ease of Alignment

One of the greatest advantages that the tapered dovetail offers over traditional dovetail s is its ease of assembly. The joint is easy to assemble due to the initial clearance as the joint is being assembled. This will be explained further in the text of this document.

Reduced Need for Tight Tolerances in Fabrication

Closely related to the ease of alignment issue is the reduced need for tight tolerances. If a joint has not been cut to tight tolerances, such as those required for a classic dovetail joint, this joint can be driven together into full union due to the initial clearance at the initiation of joint union. The wedging action that takes place during the assembly process may compensate for minor inaccuracies in fabrication as well as damage after fabrication that may have occurred.

Elimination of Starved Joints

When a classic dovetail joint is assembled, it is common for the majority of glue that has been placed on the pins and tails to be forced out of the joint due to tight tolerances. This creates a starved joint, or a joint with insufficient glue. The tapered nature of the tapered dovetail joint allows a much greater amount of glue to remain on the contact surfaces until contact is made between the two components.

Greater Strength of the Tapered Dovetail

When a classic dovetail joint is assembled it is normal for there to be some destruction of the wood fibers during assembly. This occurs as the pins are driven into the tails due to tight tolerances. The tapered nature of the tapered dovetail joint minimizes the contact and friction between the two pieces until the point at which the two components are brought into full union.

BRIEF SUMMARY OF THE INVENTION

As stated above, I have recognized the advantages of tapering the pins and the tails of a dovetail joint, creating the tapered dovetail joint, which can be more easily assembled, but preserves many of the positive qualities of a traditional dovetail joint.

It is, therefore, an object of this present invention to provide a tapered dovetail joint that will be more easily assembled than the classic dovetail joint due to the slight tapering of the dovetail pins and tails. This joint will have improved strength characteristics, similar durability, and a similar appearance to other dovetail joints.

It is the specific object of this present invention to provide the details of the tapered dovetail joint; where the tapered dovetail pins are slightly tapered, and the dovetail tails have a corresponding angle of taper. The mating of this dovetail joint will be greatly facilitated due to these corresponding tapers. The tapered nature of this joint will minimize the difficulties in assembly that would have otherwise been caused by damage to the tails, damage to the pins, swelling of tails and/or pins that may take place from time of manufacture to time of assembly, as well as minor manufacturing tolerance deficiencies in cutting of the pins and tails.

Some of the primary advantages offered by this new method of joining include: 1) The ease of alignment between the two elements to be joined; 2) Reduced need for tight tolerances in fabrication and assembly; 3) Elimination of starved joints; and 4) Greater strength of the joint inherent to its design.

BRIEF DESCRIPTION OF THE DRAWINGS

The invention is best understood by a study of the following specification when reviewed in conjunction with the accompanying drawings, wherein.

DETAILED DESCRIPTION

Figure 1:
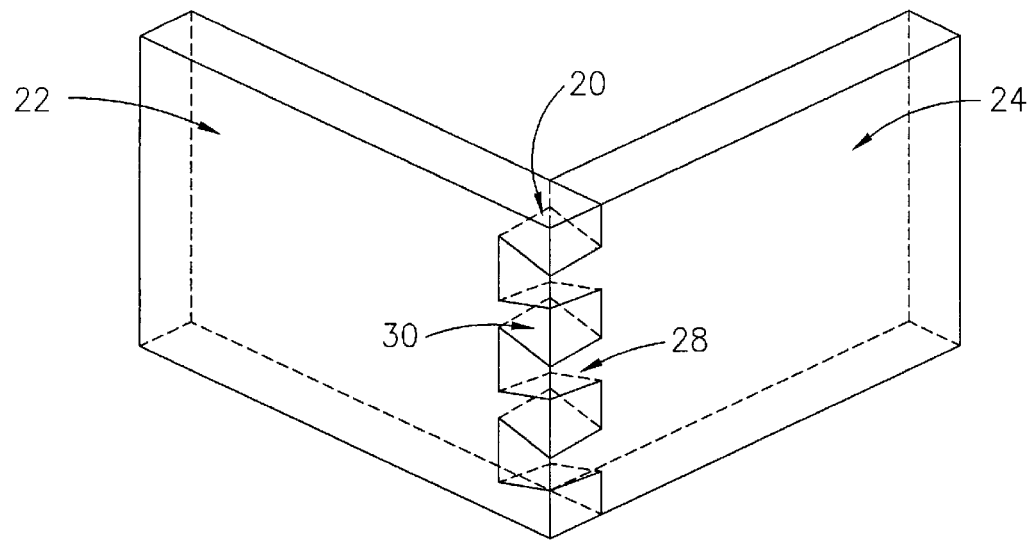
FIG. 1 is an isometric view of the tapered dovetail joint as contemplated by my invention.
Figure 2:
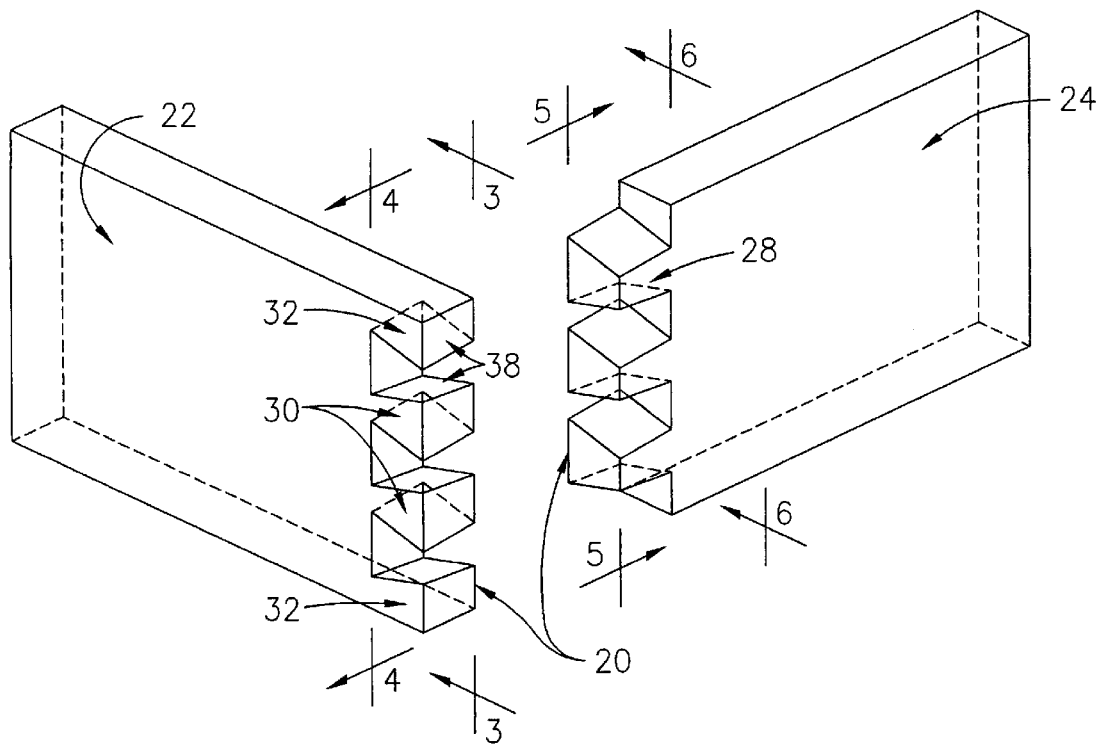
FIG. 2 is an isometric view of the two boards (or other material) of the invention before they are brought into engagement.
Figures 3, 4, 5, 6:
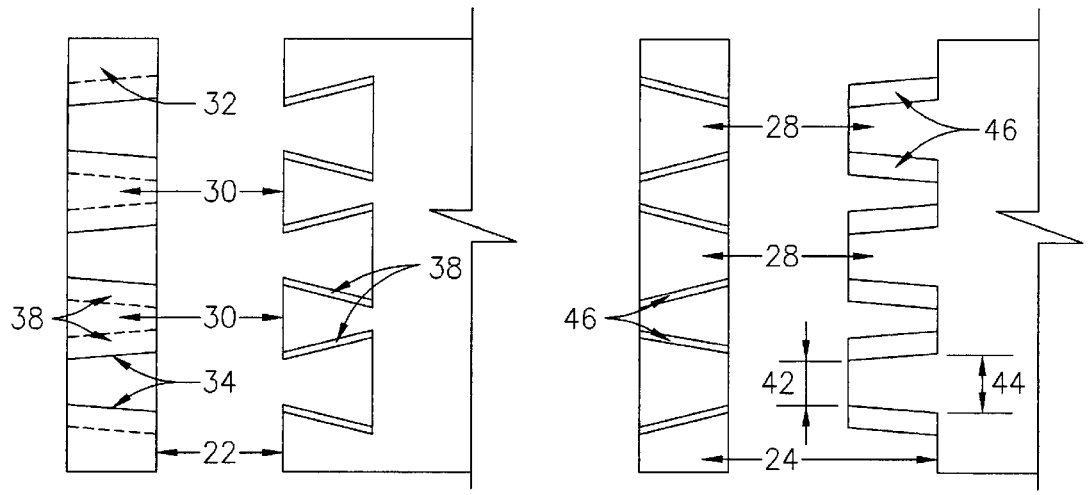
FIG. 3 is a view taken along the line 3—3 in FIG. 2.
FIG. 4 is a view taken along the line 4—4 in FIG. 2.
FIG. 5 is a view taken substantially along the line 5—5 in FIG. 2.
FIG. 6 is a view taken substantially along the line 6—6 in FIG. 2.

Attention first should be directed to FIGS. 1 and 2, and then to FIGS. 3 through 6 for the showing of how the components interlock, and the shape of the interlocking parts. A tapered dovetail joint 20 is shown as embodied in nominal 2"×8" pressure treated lumber, comprising boards 22 and 24 which are about 1½" thick by 7 7/16" tall in finish form. (NOTE: All dimensions and angles provided are examples only. The term "board" is provided as an example only, this could also be particle-board, wafer-board or other composite or natural product.) The left-hand board 22 has a plurality of full tails 30 and a plurality of half-tails 32, whereas the right-hand board 24 has a plurality of pins 28. Each of the parts (pins and tails) of the joint are made by straight-sided cuts. When viewed from the joint-end of the board (FIG. 3), the half-tails 32 as well as each of the full tails 30 are seen to have tapered cuts 34. This results in the formation of tails that taper in two directions at the same time. The tapered faces of the tails are identified by the numeral 38, and it will be seen that moving from the inside to the outside, as seen in FIG. 3 (right to left), the spaces decrease. This results in faces 38, which taper inwardly in two planes.

The pins 28 are illustrated in FIGS. 5 and 6, and also have two angles. The dovetail angel is seen best in FIG. 5, while the taper angle is most noticeable in FIG. 6. The dovetail angle, seen in FIG. 5 is that which forms the trapezoid shaped pin—in the shape of a dove's tail, which matches the sockets created by the two full tails 30 and the two half-tails 32. Looking at the pins from the joint-end (FIG. 5), they have the widest dimensions of the trapezoidal pins 28 starting on the left and sloping to minimum dimensions on the opposite face of the board. When viewing the face of the board 24 from the outer side thereof, as shown in FIG. 6, the pins taper down from a maximum dimension 44 at the base of the pins to a minimum dimension 42 at the very end of the board to. This same angle of taper can be seen in FIG. 3 with the tails. This results in planar faces 46 with a double angle to the pins. Thus, when the boards are first assembled to form the tapered dovetail joint, the pins have an allowance for movement between the tails. As the joint is moved into the final position, the pins and tails meet with a wedging action, which completes the union—all contact surfaces having mated entirely. When required, the tapered dovetail joint can be lightly hammered into the fully assembled position, overcoming damage to the pins or tails including swelling due to moisture, damage due to impact, or fabrication tolerance errors. This is possible due to the wedging action of the joint.

Figures 7, 8, 9:
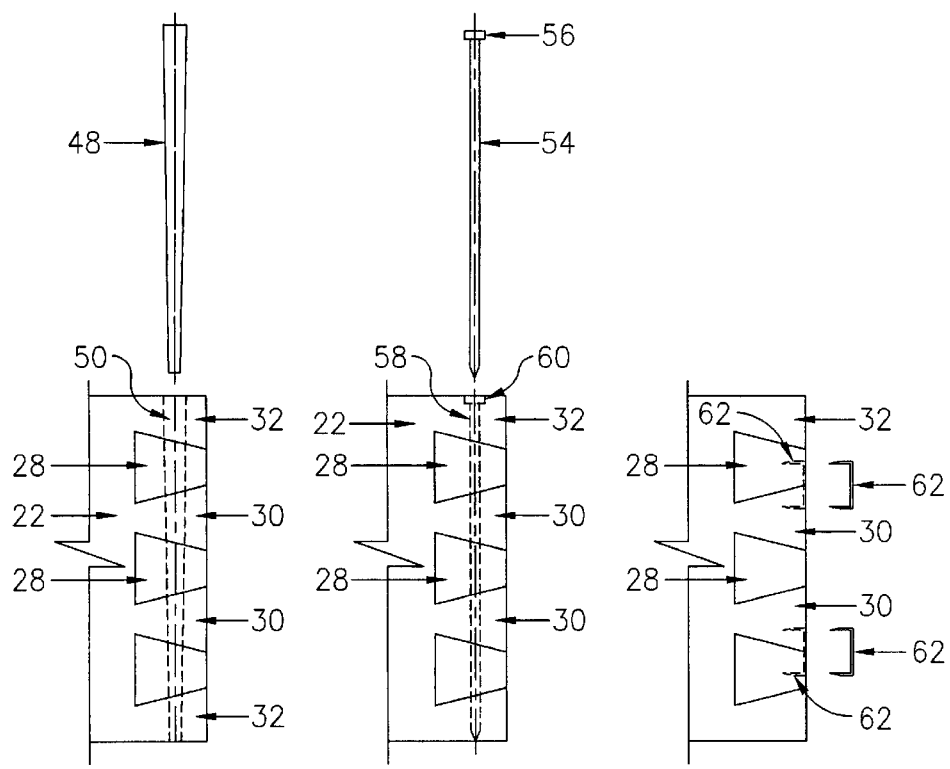
FIG. 7 is a view showing one means of securing the joint in an assembled position.
FIG. 8 is an alternative to FIG. 7.
FIG. 9 is yet another alternative to FIG. 7.

Three methods for securing the tapered dovetail joint together are shown in FIGS. 7 through 9. In addition to these three methods, the tapered dovetail joint may be glued. This method of joining—glued, is exemplified in Fig.1, where no fastening device can be seen. In FIG. 7, a tapered dowel or pin 48 is driven through all the tails and pins into a pre-drilled, tapered hole 50.

A modification to the securing method in FIG. 7 is shown in FIG. 8, where a straight pin or nail 54, with a head 56 is driven through the pins and tails into a pre-drilled hole 58 having a recessed area 60 for the head 56.

A fourth alternative to glue, FIG. 7 and FIG. 8 is shown in FIG. 9. In this case, staples or nails 62 are driven into the sides of the tails 30 and the pins 28.

Other methods for securing the tapered dovetail joint include the use of screws in lieu the materials shown. These may be tapered or straight screws.

Figure 10:
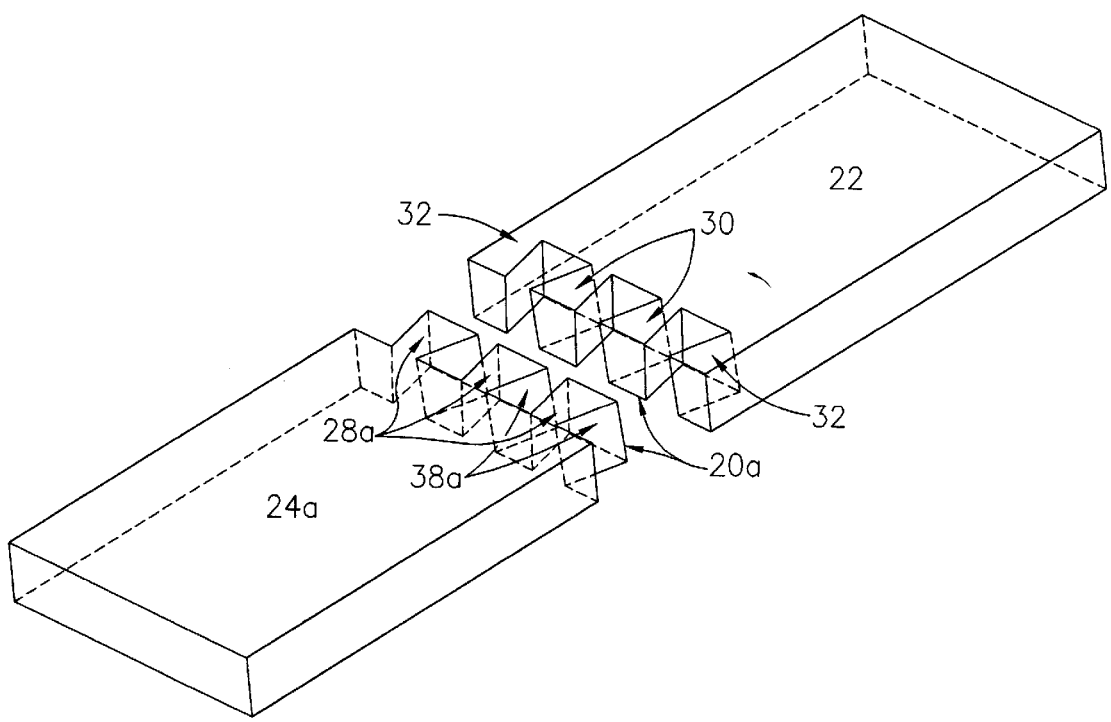
FIG. 10 is an isometric view showing a different application of the same jointing technology—two boards, or other material, arranged with the ends adjoining so that the boards are a continuation of one another.

The same principles as shown in the joining of two pieces of wood, particle board, wafer board, composite material or other material, at a 90-degree joint can also be applied to join two elements (boards or other material), at different angles (other than 90 degrees) as well as end-to-end to increase length (180 degrees). An example of this is shown in FIG. 10, where the same parts are identified by the same numbers, and like parts are identified by the same number with the addition of the suffix "a". The same method of tapered dovetails is oriented such that the connection provides for an end to end connection in the same orientation. Element 20a is a tapered dovetail joint application on an end-to-end union to increase length. Element 24a is a board with a plurality of pins oriented such that the tapered dovetail joint application serves to increase length through an end-to-end union. This joint too can be fastened by various methods including glue and those detailed in FIGS. 7–9. When joining two boards, or other material, along the same orientation to extend length, the pins 28a are oriented such that they resemble the tails 30.

Examples of certain angles and dimensions will be helpful to an understanding of the invention All of the bases (or roots) of the tails and of the pins are parallel to the end of the boards. The drawings represent a nominal 2" by 8" board of treated lumber with actual dimensions of 1½" by 7 7/16". The length of the pins 28 is the same as the thickness of the board (1½"). The angle of the dovetails in this example is 1 to 4. The angle of the taper is 1 to 12 in the example provided.

Reviewing the tails 30 area of the joint; on the outside of the joint, as shown in FIGS. 3 and 4, the tail 30 is 1½" at its widest point on the end. That same tail 30, on the inside of the end (right side of FIG. 3) measures 1¼" across. The difference of these two dimensions, ¼", represents the tapered nature of the joint. Likewise, the base of the tail 30 measures ¾" at its widest point on the outside of the joint, and ½ on the inside; again, allowing for the tapered aspect of the joint. The width of the half-tails 32 will be adjusted to compensate for the overall width of the board, completing a socket into which the pin 28 will be inserted.

The pins 28 of the joint, as detailed in FIGS. 5 and 6, have a trapezoidal, or dove's tail shape. They also have a taper that corresponds to the taper in the tails as detailed in the preceding paragraph. The width across the narrow end of the pin shown 28 is ¾" across the end, while at the base of the pin the dimension is 1—this differential, ¼", matches the taper in the sockets created by the tails of the joint. The width across the wide end of the pin 28 is 1½" at the end and 1¾" at the base of the pin. In this example, the taper is approximately ⅛" on each side over the length of the pin—1½", for a taper of 1 to 12. A taper of 1 to 12 is equal to 4.76°, which, when taken from the 90 degree angle of the pin, is equal to a taper of 85.24° (90–4.76) relative to the face of the board.

All dimensions provided are intended as examples only, as are the specific angles of the dovetail portion of the joint and the specific angles of the tapered portion of the joint, as is the material of construction of the joint. The relative strength characteristics and dimensions of the materials being used will determine the number, size and angles of the pins and tails.

When the tapered dovetail joint is being assembled, the matching tapers of the tails 30 and half-tails 32, and pins 28, as explained above, provide a combined allowance of ¼" of open space between the two faces 38 and 46 as the joint is being assembled. In the example provided above, the ¼ clearance created by the tapers will diminish as the joint is brought into full union, or into the fully assembled position. Slight imperfections to the tapered dovetail cuts, damage to the pins or tails, or swelling due to moisture can easily be overcome based on the tapered design of the tapered dovetail joint.

Those skilled in the art will now understand the invention.

Those skilled in the art will make some changes that will appeal to them, and which are to be understood as being the same invention, insofar as they fall within the appended claims.

The invention is claimed as follows:

1. A tapered dovetail joint comprising:
   a first board; and
   a second board, said first board having a plurality of integral dovetail-shaped pins spaced therein, each said pin defined by a plurality of planar faces, one pair of said planar faces having a dovetail angle sloping outwardly in the direction of the length of said first board and a secondary taper sloping transverse to the width of said first board, the second board having a like plurality of integral dovetail-shaped tails spaced therein, each said tail defined by a plurality of planar faces, one pair of said planer faces having a dovetail angle sloping inwardly in the direction of the length of said second board and a secondary taper sloping transverse to the width of said second board, said planar faces of said pins at the end of said first board engaging said planar faces of said tails at the end of said second board such as to bring said pins of said first board into close converging relation with said tails of said second board thereby forming one said tapered dovetail joint.

2. A tapered dovetail joint as set forth in claim 1 for forming an end-to-end joint other than an extension of length or a 90 degree corner, said tapered dovetail tails having an inward sloping angle in the direction of said board and a second taper transverse to said board, said dovetail pins increasing in width at a base to match said inward sloping angle of said tails.

3. A tapered dovetail as set forth in claim 1 for forming a right angle, said pins on said first board having a taper in the direction of the length of said board and a second taper on the pins transverse to the width of said first board, said tails having a taper at right angles to the direction of the length of said second board and a second taper on the tails transverse to the width of said second board.

4. A tapered dovetail joint as set forth in claim 1 for forming an end-to-end straight joint—an extension of length, said tapered dovetail tails of the adjoining boards having an inward sloping angle in the direction of the length of said boards and a second taper on the tails transverse to the width of said boards.

5. A tapered dovetail joint as set forth in claim 1, wherein the pins' taper and the tails' taper are both shallow tapers.

6. A tapered dovetail joint as set forth in claim 3, wherein all of the tapers are shallow.

7. A tapered dovetail joint as set forth in claim 1, wherein the angle of the second taper is greater than 90° relative to the face of the board.

8. A tapered dovetail joint as set forth in claim 1, wherein the secondary taper of the dovetail is less than 90°.

9. A fastening method for the tapered dovetail joint as set forth in claim 1, said fastening method comprising a tapered pin, said pin inserted into the pre-drilled, tapered hole, said pre-drilled hole traversing all pins and tails, thereby maintaining the joint in the assembled position.

10. A fastening method for the tapered dovetail joint as set forth in claim 1, said fastening method comprising a straight pin or nail with a head, said nail or pin inserted into the pie-drilled hole, said pre-drilled hole traversing all pins and tails, thereby maintaining the joint in the assembled position.

11. A fastening method for the tapered dovetail joint as set forth in claim 1, said fastening method comprising a single nail or a staple, said nail or staple driven into the two components of the tapered dovetail joint, thereby maintaining the joint in the fully assembled position.

12. A fastening method for the tapered dovetail joint as set forth in claim 1, said fastening method comprising a nail or a staple, said nail or staple driven into the two components of the tapered dovetail joint, thereby maintaining the joint in the fully assembled position.

13. A fastening method for the tapered dovetail joint as set forth in claim 1, said fastening method comprising a plurality of nails or a staples, said nails or staples driven into the two components of the tapered dovetail joint, thereby maintaining the joint in the fully assembled position.

14. A fastening method for the tapered dovetail joint as set forth in claim 1, said fastening method comprising glue or other adhesive, said glue or adhesive inserted into said joint prior to full union of the two components, thereby maintaining the joint in the fully assembled position.

15. Other fastening methods for the tapered dovetail joint as set forth in claim 1, said fastening methods including any method whereby the tapered dovetail joint is maintained in the fully assembled position.

* * * * *